Patented Mar. 13, 1945

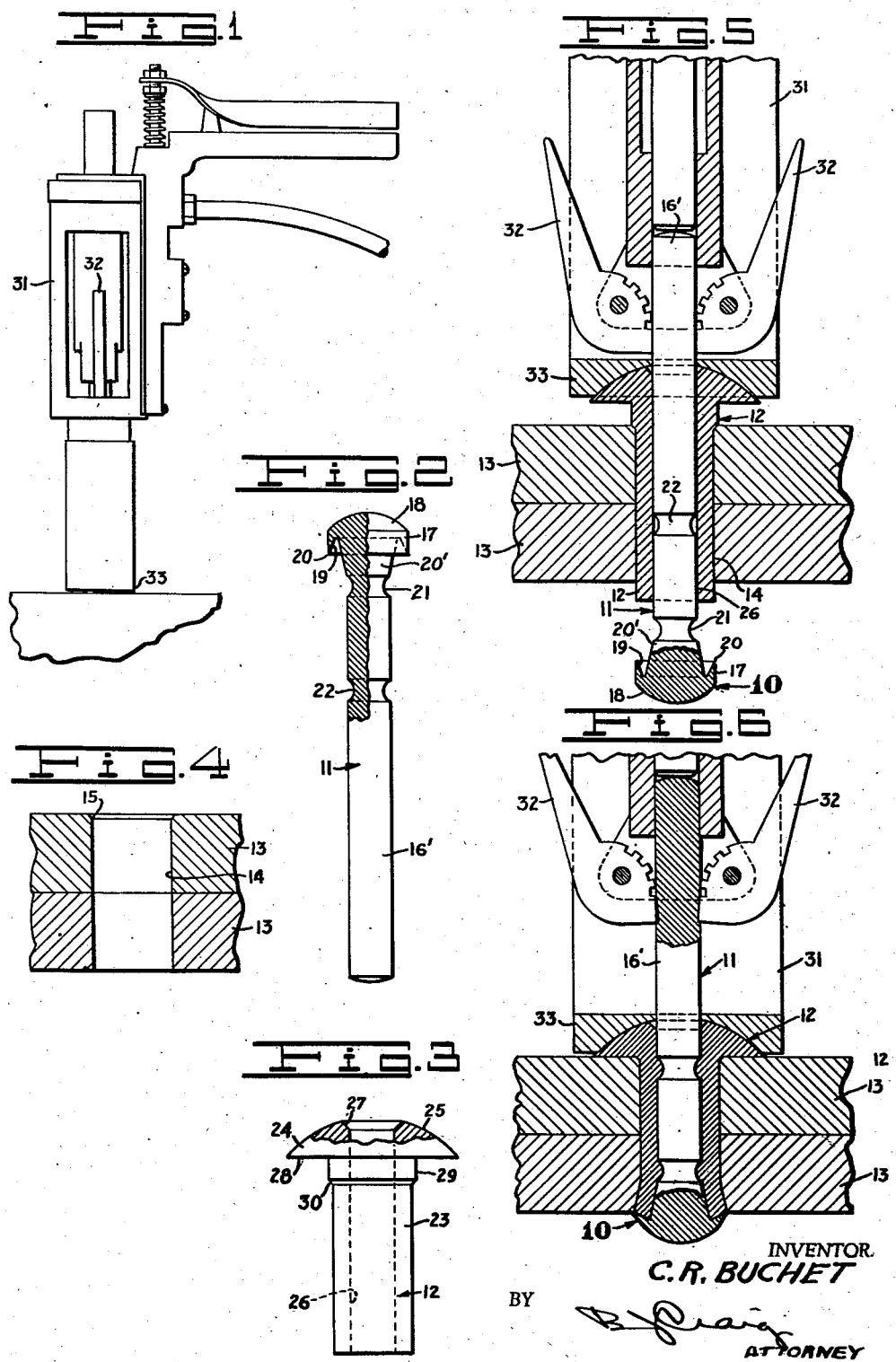

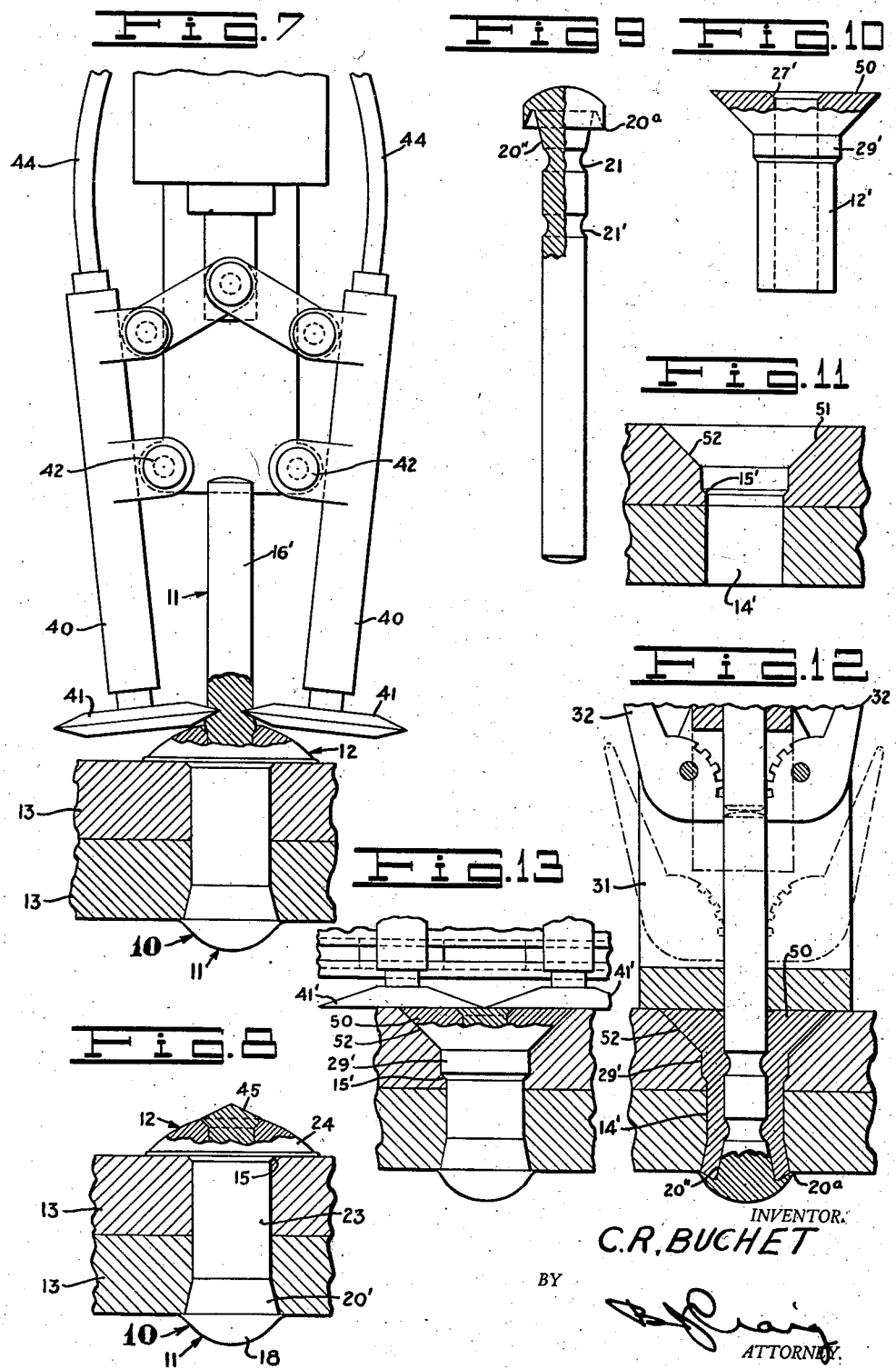

2,371,423

UNITED STATES PATENT OFFICE 2,371,423

MANDREL EXTRUSION RIVET

Conrad R. Buchet, Hollywood, Calif., assignor, by direct and mesne assignments, to B. F. B. Engineers, Incorporated, a corporation of California Application April 17, 1943, Serial No. 483,442

16 Claims. (Cl. 85—40)

This invention relates to a mandrel extrusion rivet.

The general object of the invention is to provide an improved mandrel extrusion rivet which is particularly adapted for use in airplane construction.

A more specific object of the invention is to provide a rivet comprising a socket member and a shank member and wherein the socket member has a head and a shoulder adjacent the head with the shoulder of a size so that it will be forced into the material being riveted in the act of securing the rivet in place to thus provide a tight joint.

Another object of the invention is to provide a novel rivet including a socket member and a head member and wherein the head member includes novel portions which serve to produce a tight joint.

An additional object of the invention is to provide a novel socket member for use in a mandrel extrusion rivet.

A further object of the invention is to provide a novel mandrel member for use in an extrusion rivet.

Other objects and advantages of my invention will be apparent from the following description taken in connection with the accompanying drawings, wherein:

Fig. 1 is a side elevation showing a rivet pulling member adapted to be used in connection with my improved rivet;

Fig. 2 is a side elevation partly in section showing the mandrel member;

Fig. 3 is a side elevation partly in section showing the socket member;

Fig. 4 is a sectional detail showing two members arranged to receive my improved rivet;

Fig. 5 is a sectional view showing the rivet parts assembled and ready to be secured;

Fig. 6 shows the rivet after it has been secured in place;

Fig. 7 is a view similar to Fig. 6 with the pulling member removed and the rotary mandrel cutting member cutting off the free end of the mandrel;

Fig. 8 is a sectional view partly in elevation showing the completed rivet;

Fig. 9 is an elevation partly in section showing a modified mandrel;

Fig. 10 is a side elevation partly in section showing a modified socket member;

Fig. 11 is a sectional detail showing metal prepared for joining by my rivet;

Fig. 12 is a view similar to Fig. 6 showing the rivet in secured position, and

Fig. 13 is a view similar to Fig. 12 with the pull member removed and with a rotary cutting member cutting off the shank of the rivet.

Referring to the drawings by reference characters I have shown my invention as embodied in a rivet which is indicated generally at 10. As shown the rivet includes a mandrel 11 and a socket member 12.

The rivet is adapted to secure metal layers together such as shown at 13 and in preparing to receive the rivet the superimposed layers are provided with a bore 14 which has a slight bevel 15 at the upper end.

The mandrel member 11 includes a shank 16' having a head 17 thereon. The head is shown as rounded as at 18 and has an undercut groove 19 whereby a deformable rim portion 20 is provided. The shank is tapered as at 20' adjacent the head with the diameter decreasing towards the free end of the shank. Adjacent to the end of the tapered portion a shank is provided with a peripheral groove 21 and spaced from the first groove 21 the shank has a second peripheral groove 22.

The socket member includes a body portion 23 having a head 24 shown as rounded as at 25. The body has a bore 26 therethrough which is of uniform diameter except for an outwardly flaring portion 27 at the head end of the socket member. The lower face of the head 24 is shown as planar as at 28 and the shank adjacent the portion 28 includes a shoulder 29 which is bevelled as at 30 to meet the portion 23.

In operation the shank member is inserted in the socket member and the latter is arranged in the bore 14 of the material to be united. A pull member 31 having pivoted jaws 32 thereon is then arranged so that its head 33 engages the head 24 of the socket member. The pull member is operated (by means not shown) thus causing the head 33 of the pull member to push downwardly on the head 24 of the socket member while the jaws 32 pull the mandrel member upwardly so that the parts assume the position shown in Fig. 6.

The pushing of the head 24 downwardly causes the shoulder 29 on the socket member to be forced inwardly as it engages the bevelled portion 15 and as the portion 29 is pushed inwardly the surplus metal enters the groove 21 thus securely holding the shank member in place. At the same time the tapered portion 20 of the mandrel enters the lower end of the socket member and forces this lower end outwardly into the bevelled portion 20 and also forces the surplus metal into the groove 21. The lower end of the socket member is expanded as shown in Fig. 6. Simultaneously the deformable rim 20 engaging the end of the socket member is forced outwardly to the position shown in Fig. 6 so that it covers the end of the socket member as shown in Fig. 6.

After the rivet is secured in position as shown in Fig. 6 the pull member 31 is removed and a rotary cutting member 40 having a pair of rotating cutting wheels is arranged to engage the mandrel shank 16'. The wheels 41 are pivoted to move about the axes of pivots 42 by a toggle link mechanism 43 operated by means not shown while the members 41 are rotated by flexible shafts 44 driven by means not shown. The cutting wheels 41 are arranged at a slight bevel and as the toggle 43 is straightened the wheels 41 move towards each other thus severing the mandrel shank 16' just above the flaring portion 27. The end of the rivet is then worked into the groove 27 so that it fills this groove as shown in Fig. 8 and the rivet is provided with a headed portion 45.

In Figs. 9 to 13, inclusive, I show a modification of my invention wherein similar parts are designated by similar primed reference characters. In the modification the socket member has a countersunk head 50 which fits in a countersink recess 51 in the upper sheet of the layers of metal to be united. This countersink 51 communicates with a cylindrical recess 52 which terminates in a bevelled portion 15' similar to the portion 15 and this in turn merges into a bore 14'.

The mandrel member is similar to the mandrel member shown in Fig. 2 and previously described except that as shown a groove 22' is spaced closer to the groove 21' than in the first type.

In use the modified rivet is inserted as previously described and the pull member 31 is moved from the broken line position in Fig. 12 to the solid line position in this figure, thus forcing the socket member into the metal which is to be united and pulling the mandrel through the socket member.

The shoulder 29'' functions the same as the shoulder 29 and causes metal to enter the groove 22'. The tapered portion 20'' functions the same as the tapered portion 20' and causes the metal to be forced outwardly and also inwardly into the groove 21' while the deformable rim portion 20a engages the end of the socket member 12' and is forced outwardly and simultaneously aids in producing the result described.

The member 31 is removed and cutting wheels 41' are operated to shear the upper end of the shank as shown in Fig. 13. The cutting wheels 41' have a plane lower face. They engage the shank slightly above the surface of the material being riveted and as they are moved together they are forced down. This causes the material of the shank to be forced into the groove 27' as shown in Figure 13.

The material riveted is forced outwardly as at and during the riveting operation. This produces a tight joint.

From the foregoing description it will be apparent that I have invented a novel mandrel extrusion rivet which can be economically manufactured and readily installed and which is highly efficient for its intended purpose.

Having thus described my invention, I claim:

1. A mandrel member for use in an extrusion rivet comprising a shank having a uniform diameter and having a head thereon, said shank being joined to the head by a portion which tapers towards the free end of the shank, said shank having a circumferential groove therein adjacent to the smaller end of the tapered portion.

2. A mandrel member for use in an extrusion rivet comprising a shank having a uniform diameter and having a head thereon, said shank being joined to the head by a portion which tapers towards the free end of the shank, said shank having a circumferential groove therein adjacent to the smaller end of the tapered portion and having a second groove spaced from the first groove.

3. A mandrel member for use in an extrusion rivet comprising a shank having a uniform diameter and having a head thereon, said shank being joined to the head by a portion which tapers towards the free end of the shank, said head being undercut adjacent the shank to provide a deformable peripheral fin, said shank having a circumferential groove therein adjacent to the smaller end of the tapered portion.

4. A mandrel member for use in an extrusion rivet comprising a shank having a uniform diameter and having a head thereon, said shank being joined to the head by a portion which tapers, said head having a deformable peripheral fin, said shank having a circumferential groove therein at the smaller end of the tapered portion and having a second groove spaced from the tapered portion.

5. A socket member for use in a mandrel extrusion rivet comprising a body portion and a head portion having a bore therethrough, said bore being of uniform diameter except for an outwardly flaring portion at the head end thereof, said body having a cylindrical outer surface and with a cylindrical shoulder adjacent the head.

6. A socket member for use in a mandrel extrusion rivet comprising a body portion and a head portion having a bore therethrough, said bore having an outwardly flaring portion at the head end thereof, said body having a cylindrical shoulder adjacent the head.

7. A socket member for use in a mandrel extrusion rivet comprising a body portion and a head portion having a bore therethrough, said bore having a flaring portion at the head end, said body having a shoulder adjacent the head, the shoulder having a bevelled face remote from the head.

8. A socket member for use in a mandrel extrusion rivet comprising a body portion and a head portion having a bore therethrough, the free end of said head portion being rounded, said bore being of uniform diameter except for an outwardly flaring portion at the head end thereof, said body having a cylindrical outer surface and with a cylindrical shoulder adjacent the head, the shoulder having a bevelled face remote from the head, and the lower face of the head being planar and perpendicular to the axis of the body.

9. A mandrel extrusion rivet comprising a socket member and a mandrel member, said socket member including a body portion and a head portion having a bore therethrough, said body having a shoulder adjacent the head, the mandrel member including a shank having a head thereon, said shank being joined to the head by a portion which tapers towards the free end of the shank, said shank having a circumferential groove adjacent to the tapered portion and having a second groove spaced from the tapered portion a distance sufficient to bring the second groove opposite to the socket member shoulder when the mandrel is in place.

10. A mandrel extrusion rivet comprising a socket member and a mandrel member, said socket member including an integral body portion and a head portion having a bore therethrough, said body having a shoulder adjacent the head, the mandrel member including a shank having a head thereon, said shank being joined to the head by a portion which tapers towards the free end of the shank.

11. A mandrel extrusion rivet comprising a socket member and a mandrel member, said socket member including a body portion and a head portion having a bore therethrough, said bore having an outwardly flaring portion at the head end, said body having a cylindrical shoulder adjacent the head, the mandrel member including a shank having a head thereon, said shank being joined to the head by a portion which tapers towards the free end of the shank, said shank having a circumferential groove adjacent to the tapered portion and having a second groove spaced from the tapered portion a distance sufficient to bring the second groove opposite to the socket member shoulder when the mandrel is in place.

12. A mandrel extrusion rivet comprising a socket member and a mandrel member, said socket member including an integral body portion and a head portion having a bore therethrough, said bore having an outwardly flaring portion at the head end, said body having a cylindrical shoulder adjacent the head, the shoulder having a bevelled face remote from the head, the mandrel member including a shank having a head thereon, said head being of a diameter substantially equal to the diameter of the body outer surface, said shank being joined to the head by a portion which tapers towards the free end of the shank, said shank having a circumferential groove therein adjacent to the smaller end of the tapered portion and having a second groove spaced from the first groove a distance sufficient to bring the second groove opposite to the socket member shoulder when the shank is in place.

13. A mandrel extrusion rivet comprising a socket member and a mandrel member, said socket member including a body portion and a head portion having a bore therethrough, said bore being of uniform diameter except for an outwardly flaring portion at the head end, said body having a cylindrical outer surface and with a cylindrical shoulder adjacent the head, the mandrel member including a shank having a diameter substantially equal that of the socket member bore and having a head thereon, said shank being joined to the head by a portion which tapers towards the free end of the shank, said head having a deformable peripheral fin, said shank having a circumferential groove adjacent to the tapered portion and having a second groove spaced from the tapered portion a distance sufficient to bring the second groove opposite to the socket member shoulder when the mandrel is in place.

14. A mandrel extrusion rivet comprising a socket member and a mandrel member, said socket member including an integral body portion and a head portion having a bore therethrough, said bore being of uniform diameter except for an outwardly flaring portion at the head end, said body having a cylindrical outer surface and with a cylindrical shoulder adjacent the head, the shoulder having a bevelled face remote from the head, the lower face of the head being planar and perpendicular to the axis of the body, the mandrel member including a shank having a diameter substantially equal that of the socket member bore and having a head thereon, said head being of a diameter substantially equal to the diameter of the body outer surface, said shank being joined to the head by a portion which tapers towards the free end of the shank, said head being undercut adjacent the shank to provide a deformable peripheral fin, said shank having a circumferential groove therein adjacent to the smaller end of the tapered portion and having a second groove spaced from the first groove a distance sufficient to bring the second groove opposite to the socket member shoulder when the shank is in place.

15. A mandrel member for use in an extrusion rivet comprising a cylindrical shank having a portion near one end which tapers outwardly and merges into an enlarged head portion, said shank having a circumferentially extending groove therein adjacent to the smaller end of the tapered portion.

16. A mandrel extrusion rivet comprising a socket member and a mandrel member, said socket member including an integral body portion and a head portion having a bore therethrough, the mandrel member including a shank arranged in said bore, said shank having a portion near one end thereof which tapers outwardly and merges into an enlarged head portion, said mandrel shank having a peripheral groove adjacent to the smaller end of the tapered portion.

CONRAD R. BUCHET.